United States Patent [19]

Ayling et al.

[11] 3,764,833

[45] Oct. 9, 1973

[54] MONOLITHIC MEMORY SYSTEM WITH BI-LEVEL POWERING FOR REDUCED POWER CONSUMPTION

[75] Inventors: John K. Ayling, Fishkill; Richard D. Moore, Hopewell Junction, both of N.Y.

[73] Assignee: International Business Machines Corporation, Armonk, N.Y.

[22] Filed: May 22, 1972

[21] Appl. No.: 255,897

Related U.S. Application Data

[62] Division of Ser. No. 74,432, Sept. 22, 1970, Pat. No. 3,688,280.

[52] U.S. Cl. ............. 307/296 A, 307/290, 307/238, 307/291

[51] Int. Cl. ............................................ H03k 1/02

[58] Field of Search .................... 307/291, 290, 296, 307/297, 238

[56] References Cited

UNITED STATES PATENTS

| | | | |
|---|---|---|---|
| 3,493,788 | 2/1970 | Berding | 307/291 |
| 3,564,300 | 2/1971 | Henle | 307/291 |
| 3,624,425 | 11/1971 | Blumenstein | 307/291 |
| 3,643,231 | 2/1972 | Lohrey | 307/291 X |

*Primary Examiner*—John S. Heyman
*Attorney*—Julius B. Kraft

[57] ABSTRACT

An intermittently powered true-complement generator circuit which comprises means for intermittently applying power to said circuit and generator means for receiving a single binary signal bit input prior to the application of said power and for providing a two terminal true-complement output representative of said input only when said power is applied, said generator means providing an output in the up binary state on each of the two output terminals during periods after said signal bit is received and before power is applied.

2 Claims, 5 Drawing Figures

MONOLITHIC MEMORY SYSTEM WITH BI-LEVEL POWERING FOR REDUCED POWER CONSUMPTION

This is a division, of application Ser. No. 74,432 filed Sept. 22, 1970 now U.S. Pat. No. 3,688,280.

BACKGROUND OF THE INVENTION

1. Field of the Invention

The present invention relates to monolithic integrated circuit semiconductor memory and more particularly to circuitry for high-speed monolithic memories in which both the memory array proper and the support circuitry are bi-level powered in order to reduce power dissipation.

2. Description of the Prior Art

With the ever increasing microminiaturization of integrated circuit devices associated with computer memories, the problem of power dissipation resulting in undesirable heating of the devices becomes more pronounced. As the density of devices per unit area of the integrated monolithic memory substrate is increased, the needs become greater for expedients which will minimize heating effects and thereby permit the memory itself and the support circuitry to be maintained at operating temperatures. Where the memory itself or the storage array proper is a monolithic memory cell array, the heating effect is a significant problem because of the extensive power dissipation within the monolithic array. To reduce this power dissipation, it has been previously suggested that there be employed a high power level during the active condition of the cells in the array, and a low power level when the cells are in a standby or storage condition. In such a case, high-speed response to a "read" signal or high-speed switching due to a "write" signal is still obtained since the power level during the read or write is high. Copending application, S.N. 791,477 W D Pricer filed Jan. 15, 1969 and assigned to the same assignee as the present application, describes a monlithic memory array which is bi-level powered by circuitry which provides a constant current source when the cells are in a standby, low power condition, and a constant voltage source to increase the power level when the cells are in the active condition.

The device density and consequently power dissipation within the monolithic memory chips is presently being even further increased with the inclusion of the decode and address support circuitry associated with a monolithic memory array on the same chip as the array proper. This tendency towards increased power dissipation within the chip has made it necessary for the art to seek feasible integrated circuitry providing bi-level powering, not only for the memory array, but also for the support circuitry wherein the support circuitry is in a low power or no power state when the memory array is in the inactive state, i.e., no line on the array is being selected, and in a high power state when necessary to make a selection on the array during a read or write cycle.

One problem which must be considered in correlating the bi-level powering of the support circuitry with that of the memory array proper, is the time factor involved in generating within the decode circuitry the address signal necessary to activate the gating circuit for the selected memory line. Since the supporting circuitry has been in a low power or off state during the dormant or inactive period, a time lag is customarily experienced in decoding the input to the supporting circuitry and applying the signal required to activate the selected line by applying the proper signal to the gate associated with the line.

SUMMARY OF THE INVENTION

It is the object of the present invention to provide a novel bi-level power true-complement generator utilizable in the bi-level power support circuitry of parent application Ser. No. 74,432, now U.S. Pat. No. 3,688,280.

In a bi-level powered monolithic memory array, when the high power level is applied to activate the memory array, whether a resulting high voltage level will be applied to all the memory cells in a given cline (column or row) will be determined by whether the particular gating means associated with said line will permit the application of said high voltage level to said line. In order for there to be a proper random access selection in the memory array, only the gating means associated with a selected line should permit the application of the high voltage level to said line; the gating means associated with all the other lines should prohibit the application of high voltage levels to these non-selected lines. Accordingly, only the gate receiving a preselected data signal pattern input should permit the application of the high voltage level to the line of cells associated with said gate.

In order to selectively apply the preselected data signal pattern to only the gate associated with the selected line, parent U.S. Pat. No. 3,688,280 provides decoding means for receiving a pattern of binary signals representative of a selection of one of said lines and for applying to the gating means associated with said selected line, the preselected data signal pattern input required for the gating means to connect said voltage level to said selected line. Means are provided in said patent for simultaneously applying a gating signal to each of the gating means when the array is being placed in the high power or active state, a coincidence of such a gating signal when the preselected data signal patterns on one of said gates will result in the selection of the line in the array associated with said gate, and the gate will cause a high voltage level to be applied to said line. In order to insure that the selected gate is activated with a minimum of time lag upon the application of the high power level to the chip containing the array, the bi-level powered decoding means include means for applying the preselected data signal pattern input required to activate a line to each of the gating means during the periods when power is not being applied to the decoding means. Since during the same period, low power is being applied to the array, there will be no gating signal applied to said gates and consequently, the lines will not be activated. Then, when the high power level is applied oto both the array and the decoding means, the preselected data signal pattern will be removed by the decoding means from all of the gating means except the gating means associated with selected line, whereby the preselected data signal pattern input is applied only to the gating means of the selected line coincidently with the application of the gating signal. This minimizes any time lag after the application of the high power level to the decoding means which would result in a delay in the application of the preselected data signal pattern input to the selected gate since this pattern input has been maintained at said gate during the low power or inactive period of the support circuitry.

The true-complement generator of the present invention provides an output for said above-described decoding means during the low power state which is sufficient to permit the maintenance on each of said gating means of the signal pattern input required to activate the lines respectively associated with each of said gating means. This true-complement generator is intermittently powered and comprises means for intermittently applying power to said circuit and generator means for receiving a single binary signal bit input prior to the application of said power and for providing a two terminal true-complement output representative of said input only when said power is applied, said generator means providing an output in the up binary state on each of the two output terminals during periods after said signal bit is received and before power is applied.

The foregoing and other objects, features and advantages of the invention will be apparent from the following more particular description and preferred embodiments of the invention as illustrated in the accompanying drawings.

DESCRIPTION OF THE PREFERRED EMBODIMENTS

Figures 1, 1A:
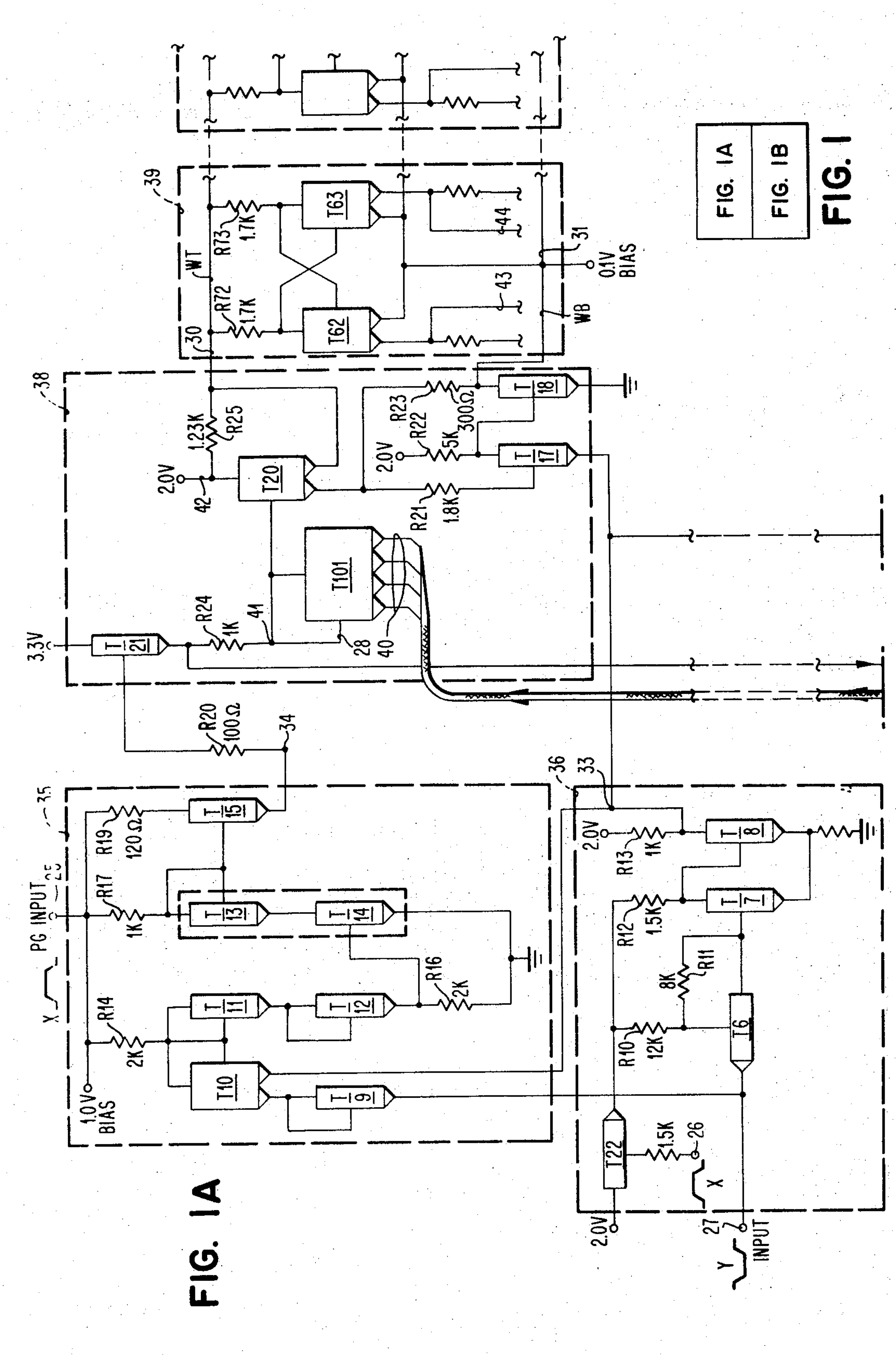
FIGS. 1, 1A and 1B combine to a composite circuit diagram of a portion of the circuitry of the memory array and the supporting circuits on a monolithic chip shown in parent U.S. Pat. No. 3,688,280, which illustrates the preferred embodiment of the present invention.
Figure 1B:
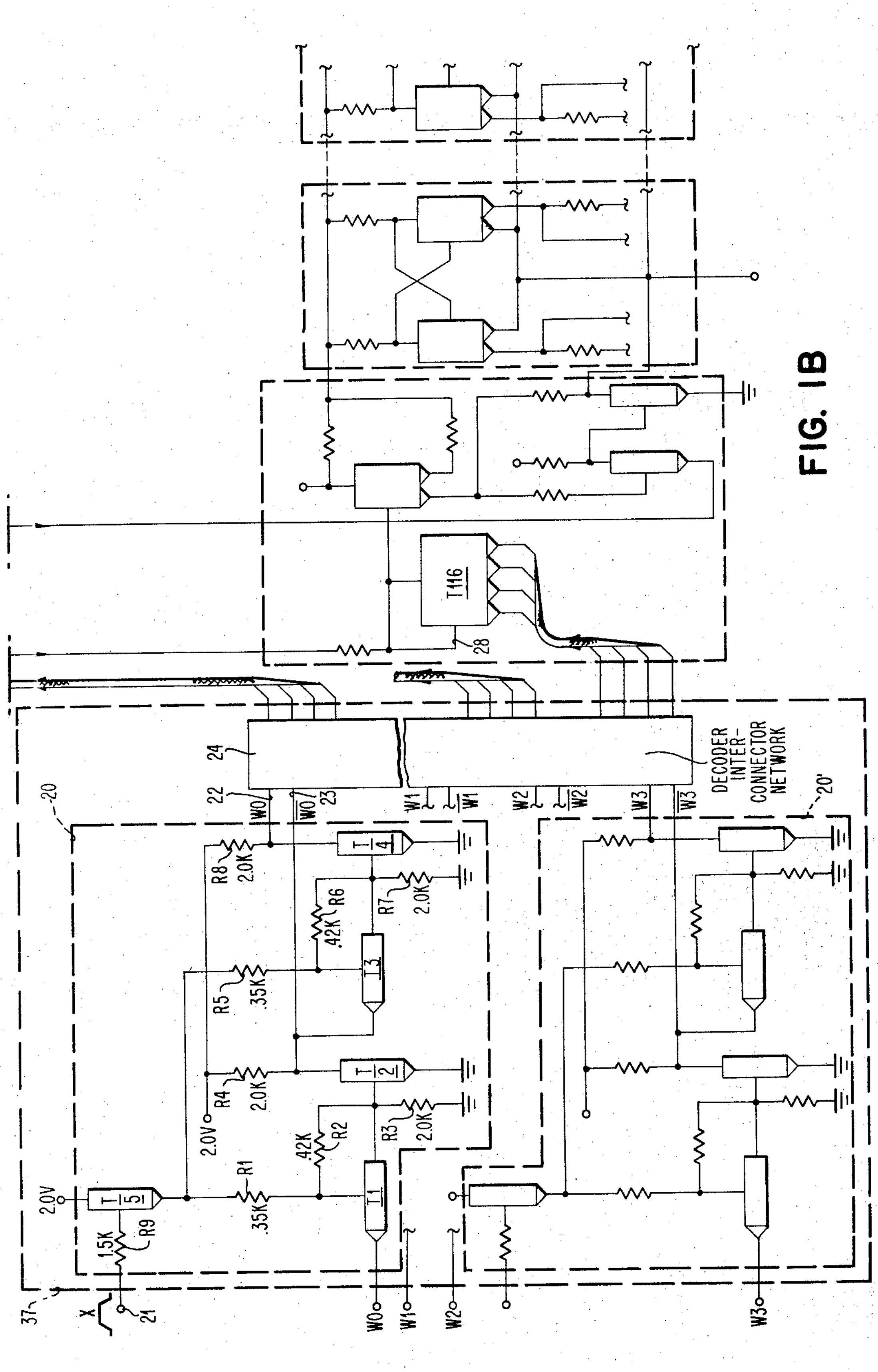

The preferred embodiment of the true-complement generator of the present invention will be described with reference to the circuit shown in FIGS. 1A and 1B which is the composite circuit of the memory system covered in parent U.S. Pat. No. 3,688,280. The present invention will be particularly described in detail with respect to the decoder circuit 37 which comprises four of the true-complement generators 20 of the present invention. Parent U.S. Pat. No. 3,688,280 should be consulted for more comprehensive details concerning the operation of the circuitry of U.S. Pat. No. 3,688,280, in which the true-complement generators of the present invention operate. Decode circuit 37 comprises four true-complement generators 20, one for each of the signal inputs W0 through W3 and line address circuits 38. Each of the line address circuits 38 is associated with one of the rows of storage cells in the memory array. Since there are 16 horizontal lines or rows, each chip has 16 address circuits 38. Each line or row has eight memory cells 39, arranged in eight lines or columns to form the memory array or matrix.

Figure 3:
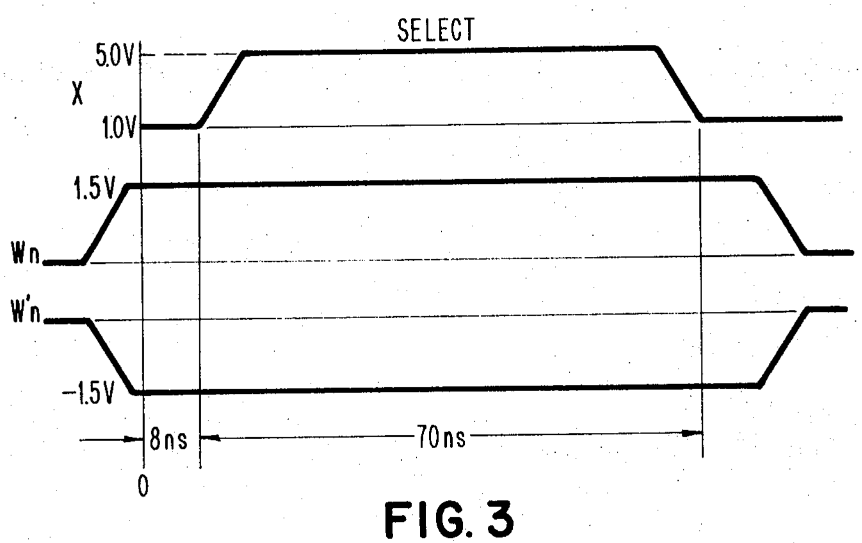
FIG. 3 is a timing chart showing the voltage waveforms of inputs and outputs to the circuits of FIGS. 1A, 1B and 2.

Considering now the structure and operation of decode circuit 37, it comprises four true-complement generators 20, one for each of data inputs W0 through W3. Each of the true-complement generators 20 comprises a pair of common emitter transistors T2 and T4, a transistor T1 for selectively connecting the input from the input terminal, e.g., W0 to the base of transistor T2, and transistor T3 for selectively connecting the collector of transistor T2 to the base of transistor T4. The true and the complement of the binary bit applied to input W0 being respectively taken from output terminal 22 (true, W0) and output terminal 23 (complement, $\overline{\mathbf{W0}}$). When the chip is in the non-selected or inactive state, i.e., no X pulse is being applied to input terminal 21, the base of transistor T5 is down, transistor T5 is non-conductive. Accordingly, the emitter of T5 is down. Consequently, the input to the bases of transistors 1, 2, 3 and 4 is down and these transistors are non-conductive. This results in the collectors of T2 and T4 being up. Consequently, the true output terminal 22 is up or in the binary "1" state and the complement output terminal 23 is also up or in the binary 1 state. Consequently, all four true-complement generators 20 provide all outputs in the binary 1 state and all inputs to the decoder interconnector network 24 are in the binary 1 or up state. Thus, while the decoder circuits are in the inactive state, although no power is being utilized within the true-complement generators 20, there is an up output on both terminals in each of these generators. During this inactive period, prior to the application of power to the decoding circuitry, a binary signal input representative of the line or row selected is applied to the four input terminals W0 to W3. These pulses are illustrated in the timing chart of FIG. 3 with pulse Wn, representing the input when a binary 1 is applied to a terminal, and pulse W'n being a binary 0. As shown in the timing chart of FIG. 3, the Wn or W'n pulses are applied to the input terminals during the inactive state and are sustained through the high power level or active state of the memory array chip. Pulses Wn and W'n are produced by any appropriate computer address circuitry and the addressing system which produces these pulses is not part of the present invention.

Let us consider now what occurs in a true-complement generator when the high power level or active level is applied to the chip. When pulse X is applied to terminal 21, the base of T5 comes up rendering T5 conductive. The emitter of T5 is in the up state. If there has been an input at terminal W0 indicative of a binary 1 (pulse Wn), the emitter of transistor T1 will be in the up state. Consequently, T1 will be non-conductive bringing the base of transistor T2 to the up state, and thereby rendering T2 conductive. This in turn will bring the emitter of transistor T3 down and T3 will be conductive, thereby bringing the base of transistor T4 down and rendering transistor T4 non-conductive. Accordingly, when the input to terminal W0 is up for a binary 1, the true output on terminal 22 taken from the collector of non-conductive transistor T4 will be up and the complement output on terminal 23 taken from the collector of conductor T2 will be down.

Conversely, if when pulse X is applied to terminal 21, input terminal W0 is down (W'n, timing chart, FIG. 3) transistor T1 will be conductive, transistor T2 will be non-conductive, T3 will be non-conductive, and T4 will be conductive. This will provide a down output on true terminal 22 and an up output on complementary terminal 23.

Considering now how the input of the four true-complement generators are interconnected to the line address circuit 38 associated with each of the 16 rows, the eight outputs: W0, $\overline{\mathbf{W0}}$, W1, $\overline{\mathbf{W1}}$, W2, $\overline{\mathbf{W2}}$, W3, and $\overline{\mathbf{W3}}$ are applied to decoder interconnector network 24 which in turn connects various combinations of the eight outputs of decoder circuit 37 to each of the gates in the 16 address circuits 38 associated with the 16 rows in the memory array. The combination of decoder circuit output applied to each of the 16 gates should be such that no two gates have the same combination applied to it.

Figure 2:
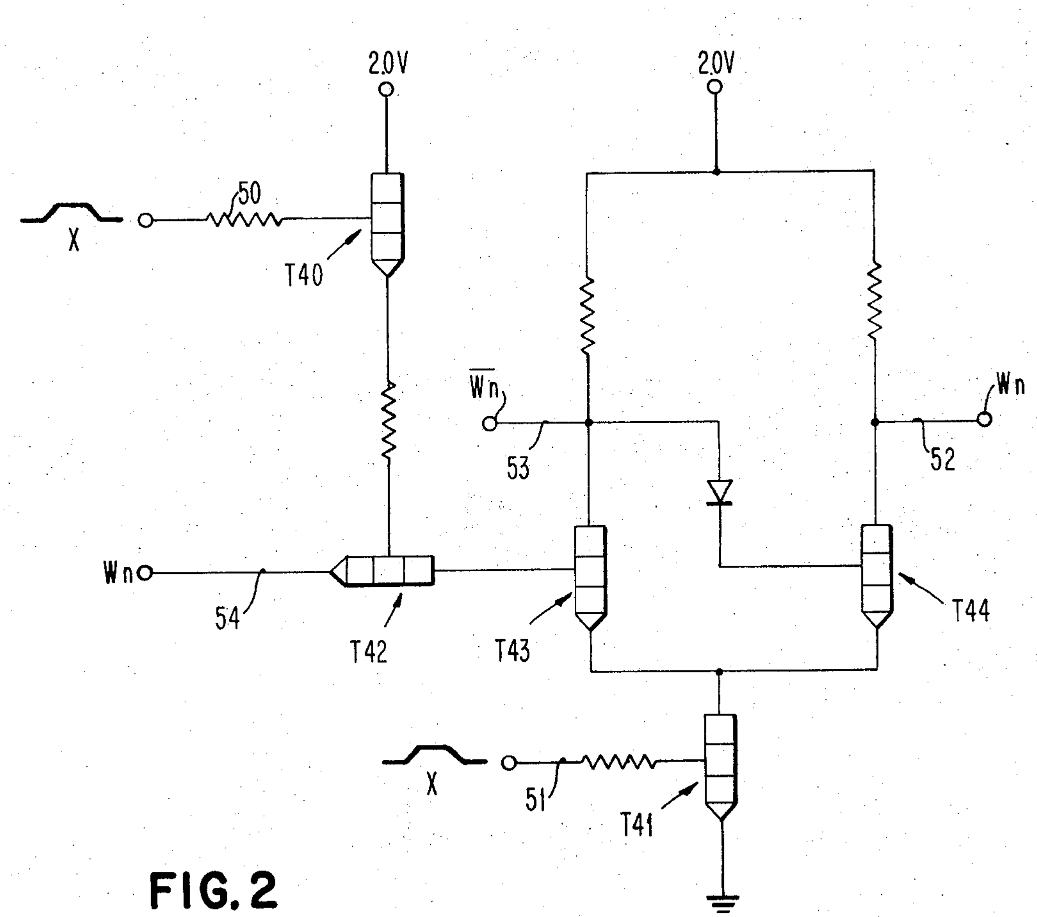
FIG. 2 is a schematic circuit diagram of another embodiment of a true-complement generator which may be substituted for each of the true-complement generators shown in FIG. 2B.

There will now be described another embodiment of the true-complement generator, which is shown in FIG. 2. This generator may be substituted for the true-complement generator 20. It functions in exactly the same manner. When no pulse is being applied to terminals 50 and 51, all of the transistors are inactive and output terminals 52 and 53 are up. Thus, Wn and $\overline{\text{Wn}}$ are up. When the X pulse is applied to terminals 50 and 51 and let us assume there is a positive input on the input terminals 54, T40 and T41 are rendered conductive. T42 is non-conductive. T43 is conductive, bringing complement terminal 53 down, thereby rendering T44 non-conductive and bringing true terminal 52 up.

While the invention has been particularly shown and described with reference to preferred embodiments thereof, it will be understood by those skilled in the art that the foregoing and other changes in form and details may be made therein without departing from the spirit and scope of the invention.

What is claimed is:

1. An intermittently powered true-complement generator circuit comprising means for intermittently applying power to said circuit, two output terminals, and generator means for providing a true-complement output at said output terminals in response to said power application together with a single binary signal bit input, said generator means providing an up binary state output at each of said output terminals in response to the presence or not of the input signal and the non-application of said power.

2. The true-complement generator circuit of claim 1 wherein said generator means comprises a pair of common emitter transistors, the collector of one being connected to the base of the other whereby one of the transistors must be non-conductive when the other is conductive, the output of one of said transistor being the true output terminal and the output of the other transistor being the complement output terminal, each of said transistors being non-conductive during the non-application of power to provide an up binary state on both the true and complement output terminals and only one of said transistors being selectively rendered conductive when said power is applied to drop the output of said transistor to a down binary state, the selection of the transistor rendered conductive being dependent on state of the binary bit applied to said generator.

* * * * *